Figure 2:
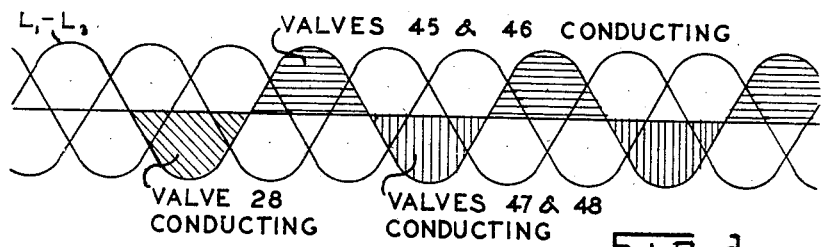

Jan. 28, 1958  J. J. RILEY ET AL  2,821,663
ELECTRONIC TIMER AND POWER REGULATOR
FOR THREE PHASE SEAM WELDER
Filed June 24, 1955  3 Sheets-Sheet 1
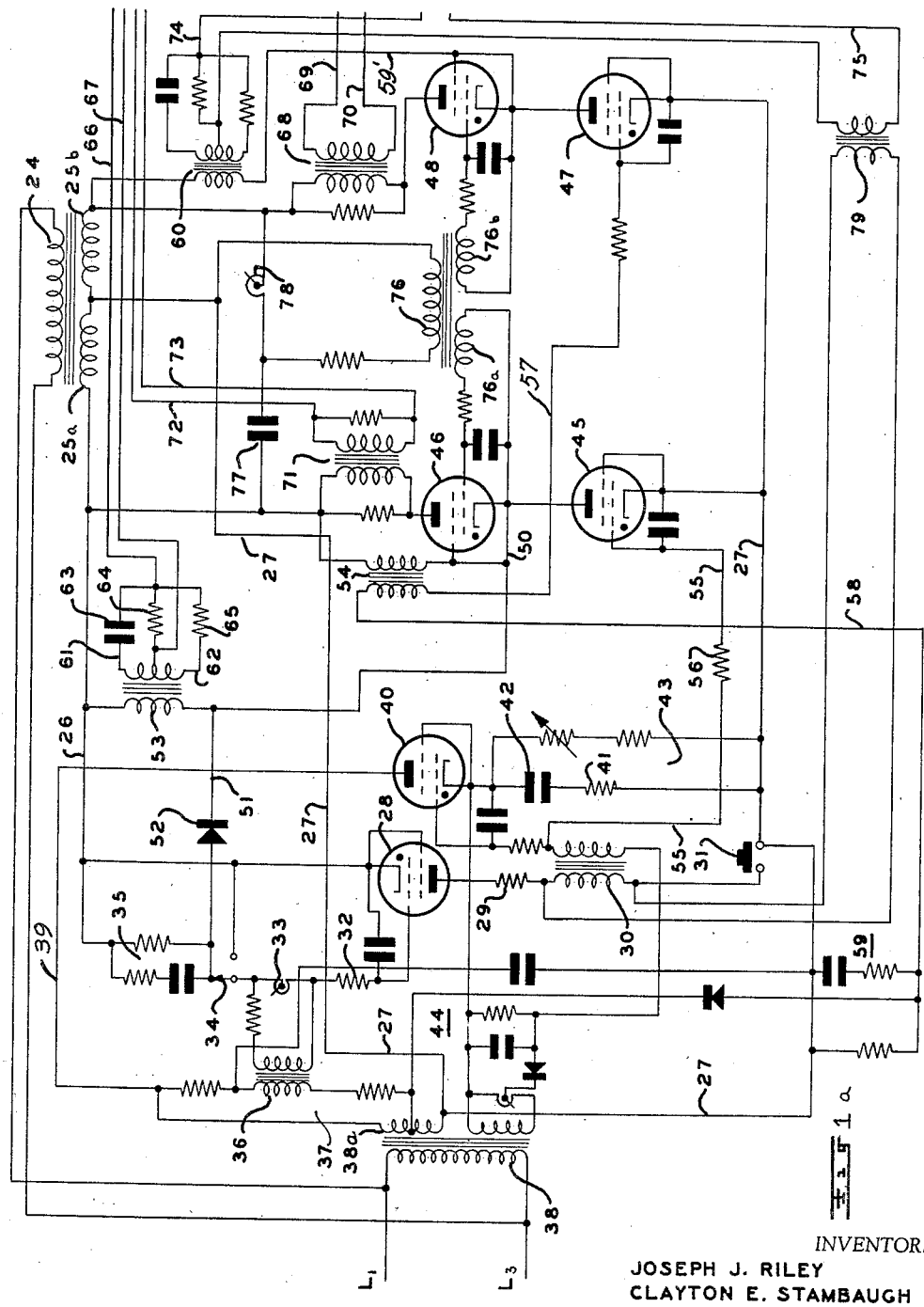
INVENTORS
JOSEPH J. RILEY
CLAYTON E. STAMBAUGH
BY *Francis J. Klempay*
ATTORNEY

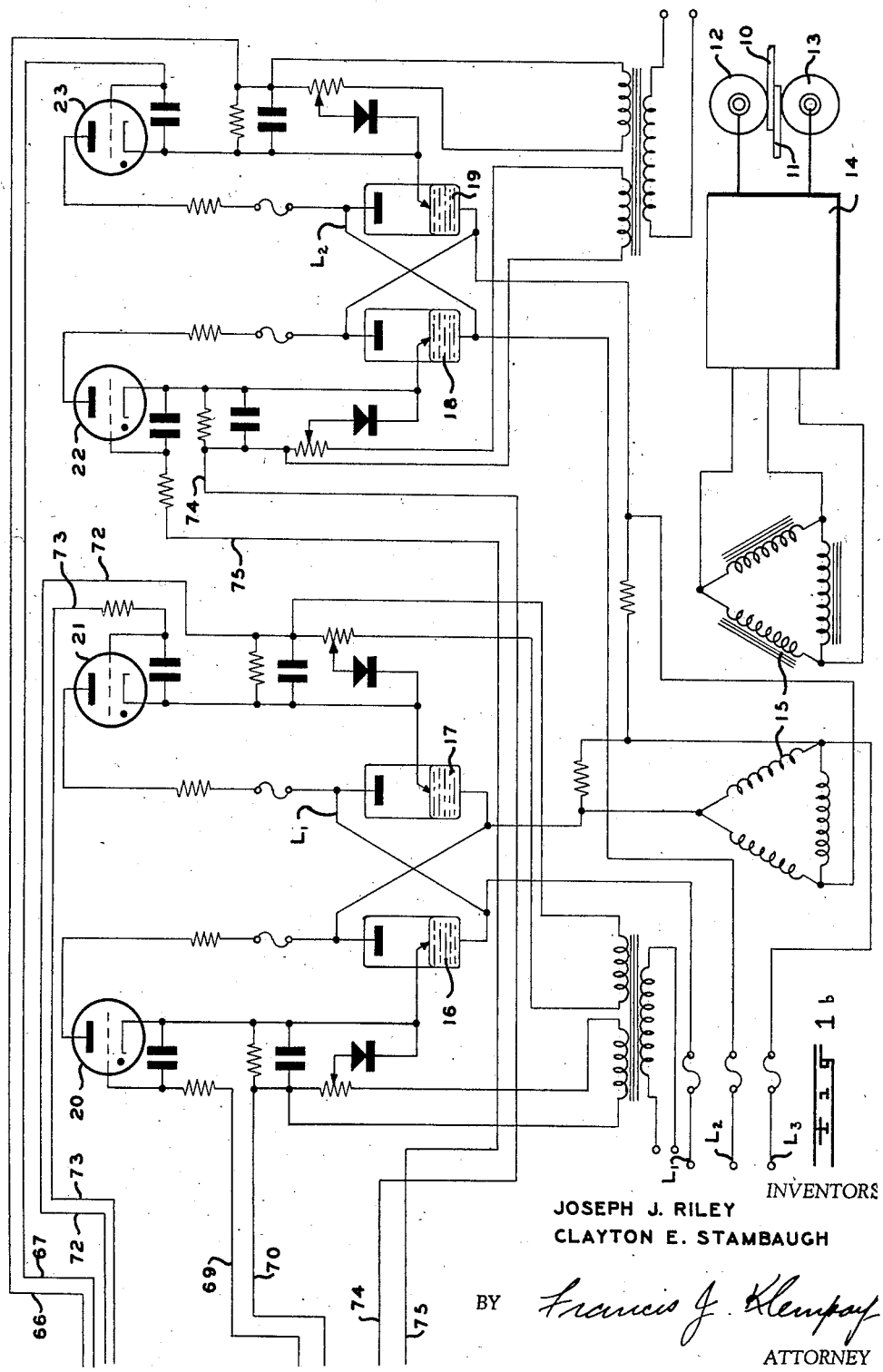

United States Patent Office 2,821,663
Patented Jan. 28, 1958

2,821,663

ELECTRONIC TIMER AND POWER REGULATOR FOR THREE PHASE SEAM WELDER

Joseph J. Riley, Warren, and Clayton E. Stambaugh, Girard, Ohio, assignors to The Taylor-Winfield Corporation, Warren, Ohio, a corporation of Ohio Application June 24, 1955, Serial No. 517,802

8 Claims. (Cl. 315—144)

The present invention relates to the art of electric resistance welding, and more particularly to improvements in automatic electronic control apparatus for use in electric resistance welding for the purpose of timing the application of welding current and regulating the intensity of such current.

As an overall object, the present invention seeks to provide a novel and improved electronic control arrangement for use in connection with three phase welding systems.

More particularly, it is an object of the invention to provide a highly simplified and economical electronic control circuit which may be effectively integrated with a three phase power system in such manner as to obtain synchronous timing control as well as accurate regulation of the energy or heat level.

Further, in respect of the above object, it is a specific object of the present invention to provide a novel control system which is basically single phase, but which is adapted in a novel manner for use in connection with the control of three phase power. That is, while we provide for the synchronous operation and regulation of three phase power, the entire circuitry constituting the timer and heat control is arranged for single phase operation, to be interlocked with one of the phases of the three phase power circuit.

Yet another object of the invention is the provision of a novel control circuit generally as above described wherein the single phase control section of the circuit is a novel adaptation of single phase timing and heat control circuits of a heretofore known general type. More particularly, the present invention seeks to provide a novel adaptation of the single phase control circuit described and claimed in the co-pending application Ser. No. 336,242, filed February 11, 1953, by Joseph J. Riley et al. for "Synchronous Timing Control for Electric Resistance Welding Apparatus," which has matured into United States Patent No. 2,721,306, so that the advantageous characteristics thereof may be realized in the control of three phase power.

The above and other objects and advantages of the invention will become apparent upon full consideration of the following detailed specification and accompanying drawing wherein is shown a certain preferred embodiment of our invention.

In the drawing:

Figure 1, in parts Figure 1A and Figure 1B, is a simplified schematic representation of the control circuit of our invention; and Figures 2–6 are illustrative graphs showing the manner of operation of our circuit.

Referring now to the drawing, and initially to Figure 1B thereof, the numerals 10 and 11 designate overlapped workpieces positioned for welding between electrode wheels 12 and 13. The electrodes 12 and 13 are connected to the output terminals of a suitable rectifier device 14 which in turn connects with the secondary winding of a three phase welding transformer 15.

The primary winding of welding transformer 15 connects with a three phase power source through power conductors L1, L2 and L3, line L3 being connected directly to the transformer 15, and lines L1 and L2 being connected through ignitron type electronic valves 16—19 connected in back-to-back pairs. The arrangement is such that by controlling the conductivity of the ignitron valves 16—19 the intensity and duration of the electric energy passed through the transformer 15 may be regulated.

In accordance with general practice, the ignitron valves 16—19 are provided with starter or igniter valves 20—23 respectively. The starter valves are connected in series with igniter electrodes of the main valves 16—19 in such manner that when the starter valves are conditioned for conduction the conductive medium within the main valves 16—19 may be ionized, rendering the main valves conducting.

In order to control both the duration and rate of flow of energy through the main valves 16—19 the starter or auxiliary valves 20—23 are provided with control grid electrodes by means of which the valves may be rendered conducting or non-conduction for predetermined time periods, and for predetermined portions of half-cycle waves of the source potential.

Referring now to Figure 1A of the drawing, illustrating the timing and regulating circuitry of our improved system, the reference numeral 24 designates the primary winding of a power transformer connecting the power source through conductors L1 and L3. The secondary winding of this transformer is divided into two parts 25a and 25b, the first mentioned of which connects two supply conductors 26 and 27.

Connected between the conductors 26 and 27 is a circuit including an initiating valve 28, which is a conventional gaseous discharge valve having an anode, cathode and at least one control electrode. Connected in series with the anode of valve 28 are current limiting resistor 29, transformer 30 and normally open manually operated initiating switch 31. When the switch 31 is closed anode-cathode potential is applied to the initiating valve 28, and the same begins to conduct upon proper conditioning of its control grid electrode.

Connected in series in the grid circuit for valve 28 are current limiting resistor 32, potentiometer 33, switch 34, and capacitor-resistor timing network 35, the latter being referenced to the cathode of valve 28 at supply conductor 26. In parallel with the potentiometer 33 is the secondary coil of a transformer 36, forming part of a phase shifting circuit 37. The phase shifting circuit is adjusted in such manner as to apply an alternating signal upon the grid of the initiating valve 28 which is leading in relation to the anode-cathode potential available at supply conductors 26 and 27 by approximately ninety electrical degrees. Thus, when the firing switch 31 is closed to apply anode-cathode potential to valve 28 the latter will begin to conduct only if the anode-cathode potential wave is at the time in its initial stages. That is, if at the instant of closing of the switch 31 the voltage wave has progressed more than half way through its cycle the grid potential applied to valve 28 by the phase shifting circuit 37 will be at negative value, and the valve will not fire until the next half cycle. In this manner it is assured that if the initiating valve conducts at all it will do so for a substantial portion of the half cycle.

Connected across power lines L1 and L3, through a first secondary coil 38a of transformer 38 and conductors 39 and 27 is a second gaseous discharge valve 40 having an anode, cathode and grid electrode. The valve 40 is arranged in anti-parallel relation to the initiating valve 28 so that it tends to fire on opposite half cycles of polarity of the power lines L1 and L3.

In series with the anode-cathode circuit for valve 40 is a current limiting resistor 41 and timing capacitor 42, both of which elements form part of a capacitor-resistor timing network 43. The desired arrangement is such that when valve 40 conducts, capacitor 42 becomes charged to initiate a timing period.

As set forth in the before mentioned co-pending Riley et al. application it is of utmost importance that the timing capacitor 42 should be charged uniformly time after time in repeating operation. To this end, the grid circuit for valve 40 includes a negative bias source 44 and the secondary coil of transformer 30. The transformer 30 is of a type which produces a high or peaked secondary wave upon a collapse of flux in its primary winding. Thus, in the half cycle of source potential following the first half cycle of conductivity of the initiating valve 28 the decay of flux in transformer 30 causes a high positive signal to be applied to the grid of timing valve 40, overcoming the negative bias from source 44 and rendering the valve 40 conductive at the instant its anode-cathode potential is sufficiently positive to sustain conduction.

Also connected across supply conductors 26 and 27 are series connected gaseous discharge valves 45 and 46. A similar pair of series connected discharge devices or valves 47 and 48 is arranged in anti-parallel with valves 45 and 46; and in this respect it will be noted that while the cathodes of both valves 45 and 47 connect supply conductor 27, valves 45 and 46 connect with conductor 26, constituting one terminal of secondary 25a, while valves 47 and 48 connect with another supply conductor 49, constituting one terminal of another secondary 25b of transformer 25.

In parallel with valve 46, but in series with valve 45, is a first circuit including conductors 50 and 51, rectox 52 and capacitor-resistor timing network 35. A second parallel circuit also connects the anode of valve 45 and supply conductor 26, this circuit comprising conductor 50 and the primary winding of a transformer 53. And in accordance with the teachings of the invention a third parallel circuit is provided, comprising conductor 50 and the primary winding of a transformer 54.

Thus, when valve 45, which may be considered a primary control valve, is rendered conducting by proper conditioning of its control grid, anode-cathode potential is supplied to valve 46, transformers 53 and 54 are energized, and the timing network 35 is charged so that a negative grid signal is impressed upon the initiating valve 28.

As will be observed in Figure 1A, the grid electrode of the primary control valve 45 is connected through conductor 55 and current limiting resistor 56 to the upper terminal of impulse transformer 30. The transformer 30 is connected in series with the negative bias generating circuit 44 and then referenced to the cathode of timing valve 40. The cathode connection for valve 40 also constitutes the upper terminal of the timing network 41, so that the grid circuit for the primary control valve 45 includes this network in series.

When transformer 30 is energized and the flux therein permitted to decay at the end of the first half cycle, a strong impulse is generated in the secondary winding which is simultaneously impressed upon the grid circuits of the timing valve 40 and primary control valve 45. Both valves are immediately rendered conductive.

Rendering of valve 45 conductive causes a charge to be placed upon the timing network 35 to render and maintain the initiating valve 28 non-conductive. And with no further impulses being derived through transformer 30, timing valve 40 is returned to a non-conductive state. However, in the single half-cycle of conduction of timing valve 40, capacitor 42 becomes fully charged, with the upper terminal thereon positive, so that a sustained positive signal is applied to the grid of control valve 45 to maintain conductivity therein. The capacitor 42, of course, begins to discharge immediately through the network 43, so that the valve 45 remains conductive for a limited predetermined time period. In the illustrated system this period constitutes the "weld time," wherein welding current flows to the work 10—11 in a manner to be more fully described.

During each half cycle of conduction of valve 45, transformer 54, connected in series therewith, is charged with flux. When this flux decays a strong impulse is provided in the secondary coil which is impressed through conductor 57 upon the grid of the secondary primary control valve 47, so that the latter fires every half cycle immediately following a half cycle of conduction in the first valve 45.

Normally the grid of valve 47 is biased negative through a circuit connecting the lower secondary terminal of transformer 54 and including conductor 58 and bias network 59.

In parallel with valve 48, but in series with valve 47 is a circuit including conductor 59' and the primary coil of a transformer 60. Thus, when control valve 47 is conductive, following every period of conductivity of valve 45, anode-cathode potential is supplied to valve 48, and simultaneously transformer 60 is energized.

In accordance with the teachings of our invention during the times valves 45 and 47 are conducting, and valves 46 and 48 are conditioned for conduction, the three phase power circuit is energized by rendering the auxiliary valves 20—23 and ignitron valves 16—19 conductive at proper times.

In the illustrated circuit arrangement the order of rotation or procession of the three phase power circuit is L1—L3, L2—L1, L3—L2; that is, source conductor L1 first becomes positive with respect to source conductor L3, followed one hundred twenty electrical degrees later by source conductor L2 becoming positive with respect to source conductor L1, followed another one hundred twenty electrical degrees later by source conductor L3 becoming positive with respect to source conductor L2, and so on.

Assuming initially that the control electrodes of secondary control valves 46 and 48 are so conditioned that conduction may commence substantially immediately upon the application of proper anode-cathode potential, the first primary and secondary control valves 45 and 46 will be rendered conductive the first half cycle of the L1—L3 phase following conduction in the initiating valve 28. And of course the last mentioned valves will continue to conduct during alternate half cycles, when conductor L1 is positive with respect to L3, until the charge upon weld time capacitor 42 is sufficiently dissipated. This is illustrated in Figure 2.

Figure 3:
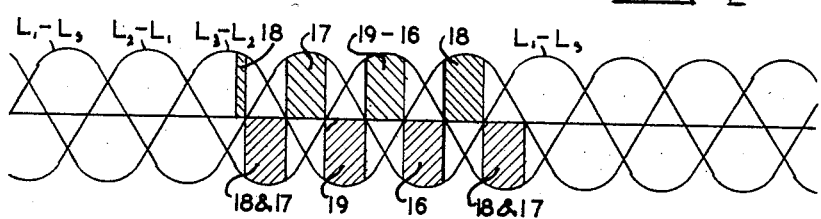

When valves 45 and 46 conduct, transformers 53 and 71 are energized. The secondary winding of transformer 71 is connected via conductors 72 and 73 in series in the control electrode circuit for auxiliary valve 21 so that the latter, along with its associated ignitron valve 17, is conditioned for conduction during the positive half cycle of the L1—L3 phase. Thus, as shown in Figure 3, during this period current will pass through the L1—L3 coil of the welding transformer, conductor L3 being connected directly to the power source.

Transformer 53, in series with the anode of primary control valve 45, has its secondary coil connected by way of conductors 66 and 67 in series in the control electrode circuit for auxiliary valve 23. Valve 23 acts as an igniter for ignitron valve 19 which has its anode connected to line conductor L2 whereby to permit the passage of current from either of the conductors L1 or L3 to conductor L2.

Approximately sixty electrical degrees following the start of the positive half cycle of the L1—L3 phase the L3—L2 phase begins a negative half cycle wherein conductor L2 is positive with respect to conductor L3. Thus, sixty degrees after primary control valve 45 is rendered conductive anode-cathode potential is applied to ignitron valve 19. In accordance with the teachings of the invention, therefore, we have provided in the secondary circuit for transformer 53 a phase shifting network comprising capacitor 63 and resistors 64 and 65. This network operates to delay the control signal provided by transformer 53 for approximately sixty degrees so that the same is in proper phase relationship with the negative half cycle of the L3—L2 phase. Ignitron valve 19 is thus caused to conduct during this half cycle, passing current through the L3—L2 coil of the welding transformer 15.

At the end of the positive half cycle of the L1—L3 phase valves 45 and 46 cease conducting, causing a collapse of flux in transformer 54, connected in series with the anode of valve 45. This causes a high positive signal to be applied to the control grid of the second primary control valve 47 rendering the latter conductive, along with valve 48 connected in series therewith. The last mentioned valves conduct during the negative half cycle of the L1—L3 phase.

Transformer 68, connected by conductors 69 and 70 in series in the anode circuit of valve 48 and in the control electrode circuit of auxiliary valve 20, is energized upon conduction in valve 48, thereby placing ignitron valve 16 in condition for conduction. Valve 16 has its cathode connected to line conductor L1, in such manner as to pass current from conductor L1 to either of the other conductors L2 or L3.

As shown in Figure 3, slightly (i. e., sixty electrical degrees) before the L1—L3 phase goes negative, to render valve 48 conductive, the L2—L1 phase goes positive. However, current can flow in the positive half cycle of the L2—L1 phase only when both ignitron valves 16 and 19 are conducting. And while valve 19 is conducting at the time the L2—L1 phase goes positive, valve 16 is non-conducting so that there will be no immediate current flow. As soon as the L1—L3 phase goes negative, however, valve 16 is rendered conductive, and current flows through the L2—L1 coil of the transformer 15.

At this time it will be observed that no current can flow in the L2—L1 coil during the first sixty degrees of the positive L2—L1 voltage wave since the ignitron valve 16 cannot be rendered conductive before such time. This is of no importance, however, since due to the interaction of the various phase voltages in a balanced three phase system of this nature the ignitron valves are inherently commutated in such manner as to cause current to pass through the load coils of each phase for only a sixty-degree portion of the voltage wave of each phase. In a balanced system there will be no conduction during the first or the last sixty-degree portion of the wave cycle.

Referring again to Figure 3, during the conducting portion of the L2—L1 phase ignitrons 16 and 19 will be conducting. Sixty degrees after the L2—L1 phase starts its positive excursion, or at the time conduction begins in valve 16, the L1—L3 phase begins a negative excursion, tending to cause current to flow from conductor L1 through the ignitron valve 16 and the L1—L3 coil of transformer 15. However, by the inherent commutative action of the phase voltages current will not flow through the L1—L3 coil until the negative L1—L3 voltage equals the positive L2—L1 voltage, at which time current flow will commutate from the L2—L1 coil to the L1—L3 coil. Ignitron valve 19 is extinguished at this time, and valve 16 alone conducts during the intermediate sixty-degree portion of the negative L1—L3 phase excursion.

Sixty degrees after the start of the negative L1—L2 phase excursion a positive excursion of the L3—L2 phase begins, placing proper anode-cathode voltage upon ignitron valve 18. Thus, to condition valve 18 for conduction we provide a phase shifting circuit across the secondary terminals of transformer 60, which is connected in series with the second primary control valve 47. This phase shifting circuit is connected through conductors 74 and 75 in series with the control electrode circuit for auxiliary valve 22, the latter acting as igniter for ignitron valve 18. This phase shifting circuit is arranged to delay the control pulse from transformer 60 for approximately sixty degrees, so that although this pulse is derived from the negative half cycle of the L1—L3 phase it is applied in phase with the positive half cycle of the L3—L2 phase, causing ignitron valve 18 to conduct during the intermediate sixty-degree portion of such half cycle.

Sixty degrees prior to the next positive excursion of the L1—L3 phase, when control valves 45 and 46 will again become conductive, the L2—L1 phase begins a negative excursion, tending to cause conduction from line L2 to line L1, through ignitron valves 17 and 18. Valve 18 is of course conducting at this time in the positive half cycle of the L3—L2 phase, so it is only necessary to condition valve 17 for conduction in order to properly energize the L2—L1 coil of transformer 15.

As will be observed in Figure 1B, the igniter circuit for valve 17 includes auxiliary valve 21, which in turn is controlled by a transformer 71 connected in its control electrode circuit through conductors 72 and 73. Transformer 71 is energized by conduction in the first secondary control valve 46, or during the positive excursion of the L1—L3 phase. Thus, it will be observed in Figure 3 that the L1—L3 phase starts its positive half-cycle sixty degrees after the L2—L1 phase starts its negative half cycle. Ignitron 17 is therefore caused to conduct concurrently with the start of the L1—L3 positive excursion, energizing the L2—L1 coil of transformer in the desired manner, sixty degrees after the start of the negative L2—L1 excursion.

We have thus described the manner and order of rendering the several ignitron valves 16—19 conductive in the desired manner for a complete cyclic period of the three-phase power source. It will be understood, of course, that this sequence of operations will repeat until the weld timing capacitor 42 discharges to such an extent that the first primary control valve 45 is not rendered conductive at the start of a positive half cycle of the L1—L3 power phase.

In initiating the operation of a three-phase welding system it is recommended that the welding transformer be premagnetized to a certain extent before full power is applied. In this manner oversaturation of the transformer core and undesirable transient currents are avoided. To this end we have provided for the passage of a small amount of current through the L3—L2 coil of transformer 15 prior to the application of full welding power.

Thus, there is provided in the control circuit for auxiliary valve 22, controlling ignitron valve 18, a transformer 79 (lower right, Figure 1A) which is connected in series in the anode circuit for the initiating valve 28. Valve 28 conducts during the negative half cycle of the L1—L3 phase, and at the end of such conducting period the flux in transformer 79 is caused to collapse, impressing a high positive control grid signal upon the auxiliary valve 22, through conductors 74 and 75. This causes ignitron valve 18 to conduct late in the positive half cycle of the L3—L2 phase, as indicated in Figure 3, so that the desired light magnetizing current is provided in the L3—L2 coil.

During the short instant in which valve 18 conducts, the L2—L1 phase is in its negative excursion, tending to draw current through the L2—L1 coil, through ignitron valves 17 and 18. And since the L1—L3 phase begins its positive half cycle sixty degrees after the L2—L1 phase begins its negative half cycle, the secondary control valve 46 will energize auxiliary valve 21 and ignitron valve 17 at such time to cause conduction in the L2—L1 coil during the intermediate sixty-degree period of the voltage wave.

As heretofore explained, due to the commutative effects of the interrelated phase voltages the flow of current in the L3—L2 phase stops when the L2—L1 coil is energized, limiting the premagnetizing current to a few degrees over the one hundred eighty degree half-cycle period.

Figure 4:
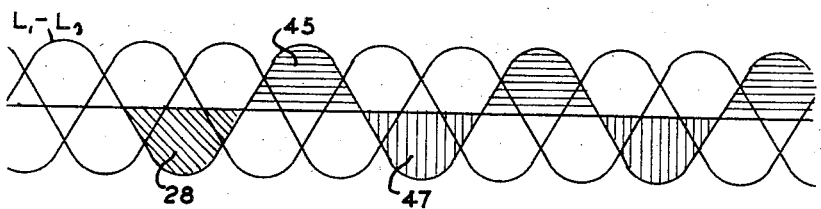
Figure 5:
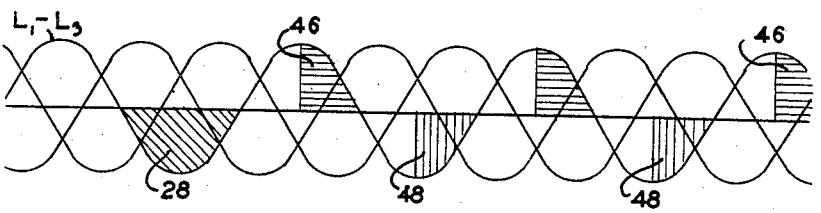
Figure 6:
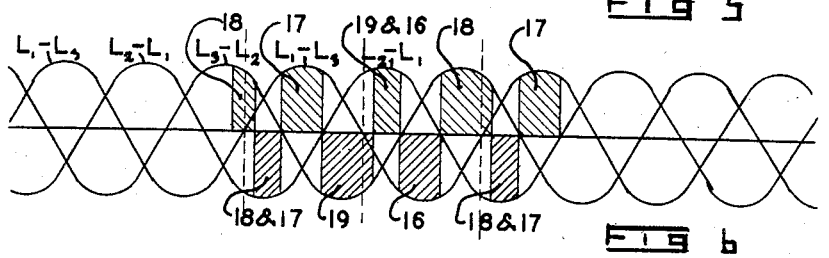

Referring now to Figures 4-6 there is shown diagrammatically the method by which we may adjust the heat level or welding current output in our system.

In connection with the secondary control valves 46 and 48 we provide a phase shifting circuit by means of which conduction in the said valves may be delayed for predetermined portions of the half-cycle anode-cathode potential waves applied to the valves. Thus, connected across the serially related secondary power coils 25a and 25b is a capacitor 77 connected in series with a potentiometer 78. Connected intermediate the capacitor 77 and potentiometer 78 is a first terminal of the primary winding of a transformer 76. The second terminal of this transformer is connected to the intermediate terminal of secondary coils 25a and 25b. Thus, there will appear across the coil 76 a potential which is in a predetermined phase relationship with the anode-cathode potential for valves 46 and 48, such predetermined phase relationship being variable by appropriate adjustment of the potentiometer 78.

Transformer 76 is provided with a pair of secondary coils 76a and 76b which are connected respectively in the grid circuits for secondary control valves 46 and 48. The potential appearing across transformer 76 will thus be applied to the control grids of valves 46 and 48 to control conductivity thereof in the manner desired.

Where it is desired to reduce the heat level of the welding system the potentiometer 78 is adjusted so that the control signals derived through secondary coils 76a and 76b are somewhat lagging in phase relation to the anode-cathode potential of the valves 46 and 48. Thus, while the primary valves 45 and 47 will conduct during the whole of the proper half cycles of the L1—L3 phase, as indicated in Figure 4, the secondary valves 46 and 48 will conduct only during later portions of the same half cycles, as indicated in Figure 5.

Referring now to Figure 6, the first period of conduction indicated is the short period of premagnetizing current provided upon the initial conduction of ignitron valve 18. The next succeeding period of conduction is in the negative half of the L2—L1 phase, when ignitron valves 17 and 18 are both conducting.

Normally, valve 17 is rendered conductive concurrently with the start of the positive excursion of the L1—L3 phase, when valve 46 is rendered conductive. However, if the control valve 46 is held non-conductive during the initial portion of the positive L1—L3 half cycle, ignitron valve 17 will not conduct until such later time, and the conducting period in the negative L2—L1 half cycle will be correspondingly shortened, reducing the heat output of that phase.

As discussed heretofore, the flow of current in each of the coils of our three phase circuit is of approximately sixty cycle duration, taking place during an intermediate portion of the voltage wave. However, this commutative action depends upon the interrelation of the several phases, and when there is no flow of current in the negative L2—L1 half cycle, for example, current will continue to flow in the positive L3—L2 half cycle. Therefore, in delaying the initiation of conduction in the negative L2—L1 half cycle, by holding ignitron valve 17 non-conductive for a predetermined portion of the half cycle, the conductive period in the positive L3—L2 half cycle is extended for an equal period. However, since the delayed conduction in the L2—L1 phase takes place during a high magnitude portion of the voltage wave, while the extended conduction in the L3—L2 phase takes place in a decreasing and low voltage portion of the voltage wave there is a substantial net loss in heat output, providing the desired lowered heat level.

In a manner similar to that described above, the secondary control valve 48 is "phased back," or caused to conduct in delayed relation to the negative L1—L3 half cycle so that conduction in ignitron 16, and therefore in the positive half cycle of the L2—L1 phase, is delayed and reduced. Again, along with the decreased conduction in the positive L2—L1 half cycle there is an increased conduction in the negative L3—L3 half cycle, resulting, however, in a net loss of heat.

It is contemplated that the heat control arrangement disclosed herein will be incorporated with a welding transformer having a plurality of "taps" so that the transformer output may be regulated in several discrete steps. Intermediate such discrete steps our heat control arrangement will provide infinite adjustment, so that an overall infinite range of adjustments may be afforded.

In summary, the operation of our circuit is as follows:

Switch 31 is closed to render initiating valve 28 conductive. This energizes transformers 30 and 79 during the negative half cycle of the L1—L3 phase. When conduction in valve 28 terminates the collapse of flux in transformer 30 initiates conduction in valves 40 and 45, while the collapse of flux in transformer 79 causes ignitron valve 18 to be rendered conductive late in the positive L3—L2 half cycle.

Valve 40 conducts for one half cycle to charge weld time capacitor 42, while during this same half-cycle period the cool time network 35 is charged by conduction in valve 45 to render valve 28 non-conductive.

The ignition of valve 18 through transformer 79 causes a mild pre-magnetizing flux to be formed within the welding transformer 15. However, transformer 79 is without further effect during the weld period since the initiating valve is now held in a non-conductive state by the cool time network 35.

During the weld time period, while capacitor 42 is discharging, control valves 45 and 46 conduct during positive half cycles of the L1—L3 phase, while control valves 47 and 48 conduct in trailing relation during negative half cycles of the same phase. Valves 45 and 47 conduct throughout the whole of their respective half-cycle periods, tending during such conductive periods to render ignitron valves 18 and 19 conductive by means of a phase delayed control signal. Valves 46 and 48 conduct throughout preselected adjustable portions of their half-cycle periods, tending concurrently with their conduction to render ignitrons 16 and 17 conductive.

In this manner current is caused to flow throughout the three phases of the welding system. The flow of current continues for a predetermined time period, until the weld time capacitor 42 discharges through network 43 to such an extent that the first primary control valve 45 fails to conduct during the L1—L3 positive half cycles.

At this time charging current from valve 45 to the cool time network 35 is discontinued, and the network begins to time out. At the end of a predetermined period the network 35 is discharged sufficiently to permit conduction in the initiating valve 28, and a new cycle of operations is begun.

Whenever the start switch 31 is released or opened the entire circuit will be deenergized, subject, however, to the proper completion of any welding period which may then be in progress.

In certain types of operations such as high speed seam welding, for example, where it is not desirable to provide a "cool time" period, switch 34, in the grid electrode circuit for initiating valve 28, is moved to short out the cool time network 35. In such cases the starting switch is closed but momentarily to initiate a heat time period, and must be closed again to effect a new weld.

It should thus be apparent that we have accomplished the objects initially set forth. We have provided a relatively simple and economical single phase timing and control circuit which is adapted in a novel manner for providing synchronous control of a three phase power circuit.

Our control circuit is basically similar to that described and claimed in the before mentioned application Serial No. 336,242 of Joseph J. Riley et al., and derives all the inherent advantages of the Riley et al. circuit as far as accuracy of timing and general simplicity are concerned, while yet being operative to regulate the flow of welding current through a three phase system.

One of the important features of our invention resides in the adaptation of a single phase synchronous control circuit comprising pairs of primary and secondary control valves wherein one of the valves of each pair is provided with time delay control signal means by means of which conduction in the said valves operates a substantial time later to effect conduction in one of the phases of the three phase power system.

Another important feature of the invention resides in the provision in the above system of heat control means operating in connection with the secondary control valves to regulate the rate of energy flow through at least one of the three phases. This provided for wide variations in the total energy flow, so that work of various sizes and composition may be properly accommodated.

A further novel and important feature of the invention is the provision, in connection with an initiator valve, of a control transformer which temporarily energizes one of the main ignitron valves to mildly pre-magnetize the welding transformer, and which is further operative to initiate the flow of welding current under balanced current flow conditions.

It should be understood, however, that the embodiment herein illustrated and described is intended to be representative only, as many changes may be made in the specific circuit arrangements without departing from the clear teachings of the invention. Reference should therefore be had to the following appended claims in determining the full scope of the invention.

We claim:

1. In a timing and control circuit for regulating the flow of three phase currents the combination of first and second pairs of ignitron valves connected in anti-parallel relation in first and second phases of a three phase power source, first and second pairs of primary and secondary control valves, means connecting said pairs of control valves in anti-parallel relation in one of the phases of said source whereby anode-cathode potential is alternately furnished to said pairs of control valves in predetermined relation to the phases of said source, means conditioning the primary and secondary control valves of said first pair for conduction during one half cycle of said one phase, means conditioning the control valves of said second pair for conduction during the following half cycle of said one phase, means interconnecting the secondary control valves of both pairs thereof with the ignitron valves for said first phase, means interconnecting the primary control valves of both pairs thereof with the ignitron valves for said second phase, and phase shifting means associated with corresponding ones of said control valves of both pairs thereof whereby in response to conductivity in said corresponding ones of said valves during alternate half cycles of said one of said phases the ignitron valves of one of the pairs thereof are rendered conductive in time delayed relation to pass current in another of the three phases.

2. Apparatus according to claim 1 further characterized by said primary and secondary control valves of each pair thereof being connected in series, and further including circuit means in parallel with at least one of said primary or secondary valves providing a discharge path for the other of the valves of the pair, and phase shifting means associated with said one of said primary or secondary valves for rendering the same non-conductive during preselected portions of its anode-cathode potential periods whereby to regulate the flow of power through at least one of the phases of the three phase source.

3. In a timing and control circuit for regulating the flow of three phase currents the combination of first and second pairs of ignitron valves connected in anti-parallel relation in first and second phases of a three phase power source, a first pair of control discharge valves operating from said first phase to control the conductivity of said first pair of ignitron valves, a second pair of control discharge valves operating from said first phase to control the conductivity of said second pair of ignitron valves, phase shifting means associated with said second pair of control discharge valves for relating discharges thereof occurring in said first phase to said second phase, each valve of said first pair connected in series relation with one valve of said second pair to define two sets of valves connected in series relation, and means connecting said two sets in anti-parallel relation.

4. Apparatus according to claim 3 wherein said second phase lags said first phase, said phase shifting means comprising transformers connected in series with said second pair of control discharge valves and means in the secondary circuits of said transformers to delay the secondary control signal approximately 60 electrical degrees from the discharge of said control discharge valves.

5. Apparatus according to claim 4 further including an initiating valve adapted to conduct for a limited portion of the period of flow of three phase current, and means associated with said initiating valve and said second pair of ignitron valves to temporarily condition at least one of said ignitron valves for conduction prior to the activation of said ignitron valves by said secondary control signal.

6. In a timing and control circuit for regulating the flow of three phase currents the combination of first and second pairs of ignitron valves connected in anti-parallel relation in first and second phases of a three phase power source, a first pair of control discharge valves operating from said first phase to control the conductivity of said first pair of ignitron valves, a second pair of control discharge valves operating from said first phase but effective in delayed relation to said first phase to control the conductivity of said second pair of ignitron valves, each valve of said first pair connected in series relation with one valve of said second pair to define two sets of said valves connected in series relation, and means connecting said two sets of valves in anti-parallel relation.

7. A circuit according to claim 6 further including means independent of said second pair of control valves for temporarily rendering at least one of said second pair of ignitron valves conductive prior to the rendering of said ignitron valves conductive by said second pair of control valves.

8. Apparatus according to claim 7 further characterized by an initiating valve adapted to conduct for a predetermined time, and said means independent of said second pair of control valves being initiated in response to conduction of said initiating valve.

References Cited in the file of this patent
UNITED STATES PATENTS

| | | |
|---|---|---|
| 2,614,240 | Bivens | Oct. 14, 1952 |
| 2,715,698 | Riley | Aug. 16, 1955 |